No. 633,658. Patented Sept. 26, 1899.
W. PAYNE.
EVENER FOR BUGGY POLES.
(Application filed June 12, 1899.)
(No Model.)

Witnesses:
E. Nixon.
Emma Nixon.

Inventor:
William Payne

UNITED STATES PATENT OFFICE.

WILLIAM PAYNE, OF PAWNEE, MISSOURI.

EVENER FOR BUGGY-POLES.

SPECIFICATION forming part of Letters Patent No. 633,658, dated September 26, 1899.

Application filed June 12, 1899. Serial No. 720,332. (No model.)

*To all whom it may concern:*

Be it known that I, WILLIAM PAYNE, a citizen of the United States, residing at Pawnee, in the county of Harrison and State of Missouri, have invented a new and useful Evener for Buggy-Poles, of which the following is a specification.

My invention relates to improvements in eveners used on buggy-poles; and the objects of my improvement are, first, to prevent the singletree from going back and striking the front wheel of the buggy or carriage; second, to prevent doubletrees from wabbling up and down; third, to prevent the doubletree and singletree from lopping down and forward, and, fourth, to prevent the breaking of bolts and buggy-clevises. I attain these objects by the mechanism illustrated in the accompanying drawings, in which—

Figure 1:
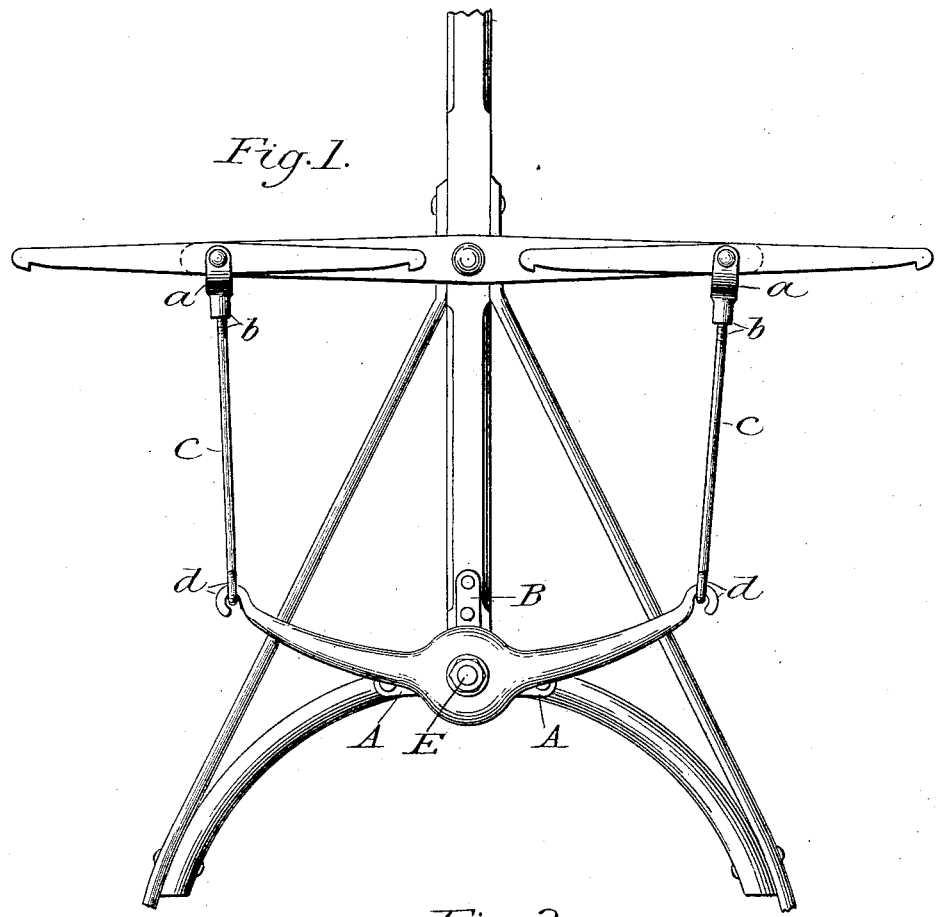
Figure 2:
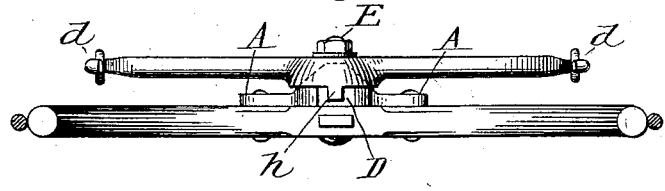
Figure 3:
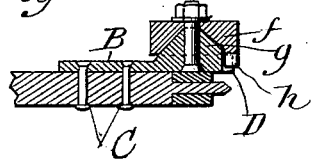

Figure 1 is a plan view of my equalizer as shown applied to the tongue of a carriage. Fig. 2 is a perspective view showing the method of connecting the evener to the tongue, and Fig. 3 is a longitudinal section through the parts shown in Fig. 2.

The description and explanation of the parts are as follows:

In Fig. 1, $a$ is clevis going over the ends of doubletree, including singletree. The opening in this clevis is three inches in length. $b$ shows the threaded end of the stay-rods, threaded for the purpose of adjusting the length of stay-rod. $c$ is stay-rods, which are seven-sixteenths of an inch in size. $d$ is eye end of stay-rod, in which are hooked the ends of evener proper. E is the bolt, which passes through evener proper, T-piece, tongue, and circle. $f$ shows vertical section of evener, showing how T-piece $g$ fits into the evener proper. $g$ is T-piece in place. $h$ is a catch of suitable size which points down from and forms a part of the evener proper and works in a slot in T-piece, said slot being large enough to allow the catch ($h$ in Fig. 1) to play back and forth, but not so large but that it stops the evener by means of the stay-rods before the singletree strikes the wheel.

In Fig. 2, A are the ends of T-piece, which extend three inches from edge of bulge in said T-piece and fit over the T in common buggy-poles and fasten by usual bolt to circle. B is end of T-piece, which extends out and fastens onto pole, (same size and fastening as given under A.) C are the holes for five-sixteenths-inch bolts to fasten T-piece to pole and circle. D is slot in T-piece, in which works the catch marked $h$ in Fig. 1. E is bolt described under $e$ in Fig. 1.

It is understood that while I have indicated the preferred size of the parts which constitute my improvements I do not wish to be limited thereto.

I am aware that prior to my invention eveners for buggy-poles have been used made of straps commonly known as "stay-straps," which run from doubletree to circle; but to my knowledge there has never been any evener used similar to the one above described.

Therefore what I claim as my invention, and desire to secure by Letters Patent, is—

1. A tongue provided with a convex plate on its inner end, a pivoted evener having a concave surface fitting said plate, a doubletree and rods connecting the evener with the doubletree all combined as set forth.

2. A tongue provided with a convex plate on its inner end, said plate having a slot therein, a pivoted evener having a concave surface fitting said plate and further having a catch working in said slot, all combined as set forth.

3. A tongue having a T-plate on its rear end, said plate being provided with a convex enlargement, a pivoted evener having a concave surface fitting said convexity, a doubletree and adjustable rods connecting said evener and doubletree, all arranged as set forth.

WILLIAM PAYNE.

Witnesses:
EMMA NIXSON,
J. E. JUDD.